Nov. 22, 1966 P. H. SECKEL 3,286,305
APPARATUS FOR CONTINUOUS MANUFACTURE OF HOLLOW ARTICLES
Filed Sept. 3, 1964 3 Sheets-Sheet 1

INVENTOR
PETER H. SECKEL
BY
Morgan, Finnegan, Durham vFi
ATTORNEYS

Nov. 22, 1966  P. H. SECKEL  3,286,305
APPARATUS FOR CONTINUOUS MANUFACTURE OF HOLLOW ARTICLES
Filed Sept. 3, 1964  3 Sheets-Sheet 2

INVENTOR
PETER H. SECKEL
BY
Morgan, Finnegan, Durham & Pine
ATTORNEYS

INVENTOR
PETER H. SECKEL
BY
ATTORNEYS

United States Patent Office 3,286,305
Patented Nov. 22, 1966

3,286,305
APPARATUS FOR CONTINUOUS MANU-
FACTURE OF HOLLOW ARTICLES
Peter H. Seckel, Wayne, N.J., assignor, by mesne assign-
ments, to Rexall Drug and Chemical Company, Los
Angeles, Calif., a corporation of Delaware
Filed Sept. 3, 1964, Ser. No. 394,172
7 Claims. (Cl. 18—19)

This invention relates to an apparatus for producing plastic articles in a continuous manner, and, more particularly, hollow plastic articles of indefinite length, as, for example, flexible corrugated tubing.

A typical present practice for producing relatively thin-walled, flexible corrugated tubing, i.e., transversely grooved tubing, involves the use of mating mold halves. The halves define, internally, a mold cavity of the desired corrugated configuration. With such apparatus, according to one known method, corrugated tubing may be produced by placing a tube of uncured plastic material within the corrugated mold, applying suitable amounts of heat to the plastic material, introducing air under pressure to the interior of the tube to expand the tube into intimate contact with the corrugated surfaces of the mold, and thereafter, removing the tube having the corrugated configuration from the mold and curing it.

This, and other similar batch type techniques, are cumbersome, laborious, and inefficient. They are generally not adapted to producing corrugated tubing in a continuous manner. Further, as the final tube length is controlled by the length of the mold, it is necessary for a fabricator to have on hand numbers of different size molds in order to meet demands for various lengths and diameters of tubing. The tube lengths available from the batch fabrication procedures are usually short. Thus, high capital costs in addition to high labor charges are involved when transversely corrugated tubing is sought to be manufactured by batch techniques. These limitations and disadvantages are present when batch techniques are used to make substantially any molded article. However, they become more serious and aggravated when the desired molded product is to be made in varying lengths.

More recently, there have been several attempts to produce flexible hollow plastic articles, including corrugated tubing, in a continuous manner. In general, these efforts involve the use of two conveyor assemblies, located one above the other in a vertical plane, which continually carry matching pairs of mold halves or segments past the orifice of an extrusion die. In this manner, a tube of hot plastic material leaving the extrusion die is deposited between a matching pair of mold segments which move, on the respective conveyor belts, past the die orifice. As the mold halves move toward the die orifice on the respective conveyor belts, they are caused to close to present a mold intended to form the desired article. In blow molding articles in such a continuous manner, air, or other fluid, is introduced through an appropriate opening in the extrusion die to cause the hot, soft, plastic tube leaving the extrusion die to conform to the configuration of the matching mold segments. Known apparatus and techniques for producing shaped hollow article in a continuous manner, although capable of producing quantities of such articles, are subject to several important disadvantages and objections.

A major obstacle to be overcome in continuous blow molding systems is the rapid dissipation of heat from the molds. Blow molding techniques require relatively high extrusion temperatures, i.e., in the neighborhood of 350° F., in order that the plastic extrusion composition be mobile and capable of responding to relatively low blow molding fluid pressures. At low temperatures, the fluid pressure required to lay or blow the plastic composition against the mold surfaces increases markedly, and the plastic composition does not faithfully conform to the mold surfaces. Consequently, a reduction in the amount of heat to be dissipated from the molds may not be obtained by the use of lower molding temperatures.

Conversely, when an appropriately high extrusion temperature is utilized in continuous blow molding without adequate cooling of the mold sections, the heat prevents sufficient setting of the plastic. Large production losses may be encountered, because the articles leaving the blow molding system will not be self-supporting. They tend to be unable to retain the desired shape imposed by the molds, and have a tendency to collapse.

The required dissipation of heat in known batch blow molding systems may be accomplished in a relatively simple manner. This is done by providing the molds with internal passages for the circulation of cooling fluids. As the molds are usually stationary, it is relatively easy to design leak-proof internal passages for adequate heat transfer. Nevertheless, though cooling of the molds may be readily achieved in batch molding, the time involved in cooling the molds in batch blow molding constitutes the greater portion of the molding cycle.

In continuous blow molding, on the other hand, the adaption of internal circulating fluid cooling passages is extremely difficult. The mold sections, necessarily, consist of many articulated parts. They are constantly opening and closing and constantly travelling. Proper sealing of any internal passages is virtually impossible.

For this reason, continuous blow molding systems seek to cool the mold surfaces externally rather than internally. This requires highly effective heat transfer because the required temperature drop is often in the neighborhood of 150° F. and, frequently, is much higher. In those systems in which the matching mold halves are arranged on conveyor chains or belts, it can be readily appreciated that the surfaces exposed to the atmosphere are limited to the sides and ends of the molds. This follows, because the bases of the mold halves are secured to the respective runs of the conveyor. Where the mold halves are large and the distances between adjacent mold parts on the respective conveyor runs are small, the ability of the end surfaces to dissipate heat is severely reduced, and, as a practical matter, only the sides of the molds are available for effective heat dissipation.

One technique which may be resorted to in coping with the aggravated problem of cooling in continuous blow molding systems resides in slowing down the operation of the machine. In this way, the cycle is lengthened between the time the mold halves grasp the tube leaving the extrusion die orifice, firmly close and then reopen to eject the article. This technique is not a desirable solution, because it serves to reduce the output of the machine and thereby defeats one of the major advantages of continuous blow molding. An alternative to reducing the speed of the continuous blow molding machine resides in lengthening the runs of the conveyors upon which the molds are mounted. In this way, the rate of movement of the molds may be maintained at the expense of compactness of the blow molding machine equipment. Additionally, overall lengthening of the machine is an undesirable solution because of the increased capital expenditures required, increased maintenance charges and the greater likelihood of breakdown because of the substantially increased number of precision moving parts.

It is a primary object of this invention to provide a continuous blow molding apparatus for the high-speed production of shaped plastic objects, which apparatus overcomes the difficulties attending the use of heretofore known blow molding apparatus while retaining all the desirable advantages flowing from continuous blow molding.

It is another object of this invention to provide an improved apparatus for high-speed continuous molding of hollow objects having complex configurations which faithfully and uniformly conform to intricate mold surfaces by the use of relatively high extrusion temperatures, low fluid blow pressures, while at the same time providing for rapid and effective cooling of the molds.

It is a further object of this invention to provide an improved apparatus for the continuous high-speed production of hollow objects from plastic materials in continuous, indefinite lengths.

It is a still further object of this invention to provide an improved apparatus for the high-speed production of hollow objects from plastic materials in a continuous length, in which predetermined sections of a given length will have a desired, preselected configuration, which configuration may be repeated at desired intervals throughout the length of the material leaving the apparatus.

It is yet another object of this invention to provide an improved apparatus for the continuous high-speed production of hollow objects from plastic materials by blow molding in which the mold segments are located on a single, endless conveyor, are self-registering and have a high percentage of their surfaces exposed to the atmosphere for quickly and effectively dissipating heat.

It is still another object of this invention to provide an improved apparatus for the continuous high-speed production of hollow objects from plastic materials by blow molding in which the mold segments may be quickly and easily removed from, and inserted into, the endless conveyor to replace defective mold segments, even when the apparatus is in operation, and to insert mold segments having different internal object-forming configurations, whereby the apparatus of this invention will form, continuously, indefinite lengths of a molded hollow object having predetermined sections of its length of a different configuration than other selected sections, and whereby the mold segments may be quickly and readily replaced with mold segments having different internal object-forming configurations to produce an article of an entirely different character than produced on a given previous production run.

It is another object of this invention to provide an improved apparatus for the continuous production of hollow objects from plastic materials by blow molding in which the length of the endless conveyor may be quickly and easily adjusted and varied, thereby providing a highly flexible apparatus.

It is still another object of this invention to provide an improved apparatus for the continuous production of hollow objects from plastic materials by blow molding, which apparatus is compact, has relatively few precision moving parts, but which, at the same time, is capable of forming sharply defined objects having intricate shapes.

Other objects, features and advantages will become obvious to those skilled in the art from the detailed description of the illustrative embodiments taken from the accompanying drawings, in which.

Briefly, the improved blow molding apparatus of the invention comprises an extruder provided with a heater for raising the temperature of the macromolecular plastic composition and means within the extruder for forcing the heated, mobile, plastic composition through an extrusion orifice or die. The extrusion orifice is spatially oriented with respect to the mold conveyor assembly so that the tube formed by, and leaving, said orifice may be laid against the inner surfaces of the closed molds by the flow fluid as said molds pass by the extrusion orifice and travel away from said orifice. The conveyor assembly not only supports the mold segments but includes means for actuating the mold segments to open and close the molds in timed relation to the position of the molds with respect to the extrusion orifice.

The apparatus of this invention will be described in connection with the manufacture of continuous lengths of thin-walled, flexible, transversely corrugated tubing. It should be understood, however, that the description of the invention in connection with the corrugated tubing is by way of illustration only. Persons skilled in the art will readily recognize that other and different objects may be made in accordance with the invention by the selection of the proper mold configurations. For convenience, the apparatus of the invention will be described by reference to its several sub-assemblies.

Extruder assembly

Figure 1:
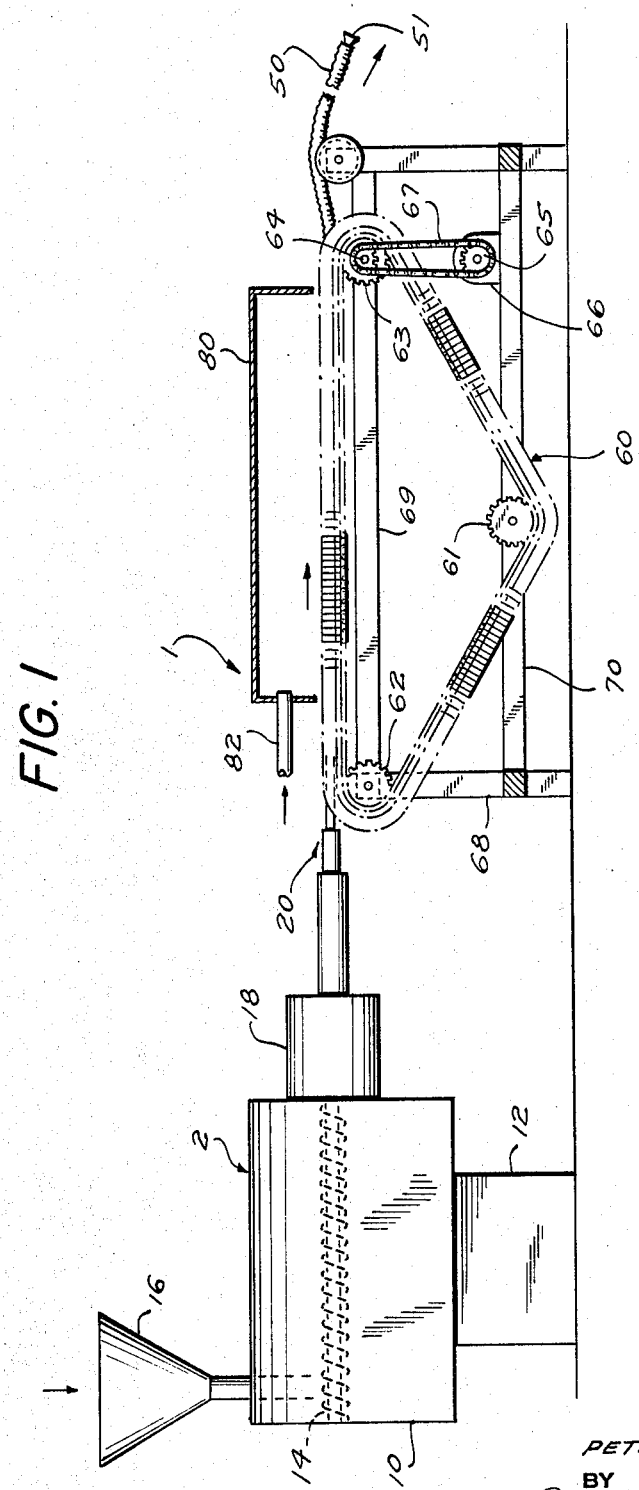
FIGURE 1 is an elevational view schematically illustrating the improved blow molding apparatus of the invention.

The extruder assembly 2 is illustrated, generally, in the left-hand portion of FIGURE 1, and forms no part, per se, of the invention. For simplicity, a screw extruder is shown. The extruder assembly includes a heated housing 10 supported on a pedestal 12. A hopper 16 is connected to the top of the housing 10 and serves as the storage bin for the macromolecular feedstock composition from which the objects, as flexible corrugated tubing, are to be made.

Preferably, the feedstock material is gravity fed into the heated housing 10 as required, and suitable flow control means may be provided to automatically admit the feedstock into the housing. A screw conveyor 14, suitably driven, is located within the housing for further blending the feedstock composition and for moving it axially through the housing. The drive means (not shown) for screw 14 is preferably of the variable speed type to permit different rates of flow through housing 14, and the balance of extruder assembly 2, including the extrusion die, indicated generally at 20.

From housing 10, the feedstock enters a heating zone indicated generally at 18. Any suitable heating means provided with appropriate temperature regulators may be utilized for controlling the temperature in the heating zone 18 and of the housing 10. The heating zone should be adequate to raise the temperature of the feedstock composition to the point where it is rendered mobile and may readily flow through the extrusion die without the application of high extrusion pressures.

The apparatus of the invention is not limited to use with any one macromolecular feedstock composition. Any suitable material may be passed through the apparatus, as, for example, thermoplastic resinous materials, including cellulose derivatives as the esters and ethers (e.g., cellulose acetate, cellulose nitrate, cellulose acetate butyrate, etc., vinyl polymers and copolymers, polymerized vinylidene chloride and copolymers of vinyl chloride and vinyl acetate, among others.

Extrusion die

Figure 5:
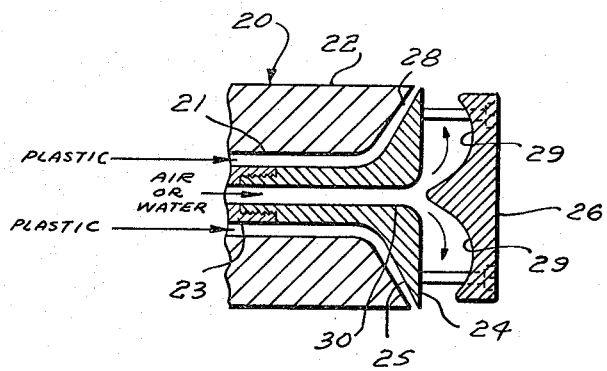
FIGURE 5 is an elevational view, in section, of one form of extrusion die which may be used with the apparatus of the invention.

After leaving the heating zone, the heated feedstock composition enters the extrusion die 20. As shown in FIGURE 5, a suitable extrusion die for use with the apparatus of this invention is composed essentially of three (3) parts: an outer sleeve or die body 22, a die cap 24, and a deflector 26. The extrusion die assembly may be associated with the extruder assembly in any of the well-known methods.

Die body 22 is provided with an annular, smooth bore 21 and ends in an outwardly flared opening 28. Die cap 24 is concentrically fitted within bore 21 and is removably secured to stem 23 by means of threads. The threaded mounting of die cap 24 on stem 23 permits axial adjustment of the die cap with respect to opening 28 thereby permitting a size adjustment of the die orifice. Deflector plate 26 is mounted on die cap 24.

As may be well understood by those skilled in the art, the heated feedstock composition from heater 18 flows along the annular passage 21 and outwardly through the annular orifice formed by surface 28 of die body 22 and the surface 25 of die cap 24. Preferably, the outer extremity of surface 28 and surface 25 are formed with sharp corners in order that the plastic stream passing through the die orifice leaves the die quickly and does not adhere to any die surface.

The blowing fluid is fed through annular bore 30 formed in die cap 24 and impinges against deflector surfaces 29 of plate 26. The direction of the fluid flow past the deflector surfaces 29 is indicated, generally, by the arrows. The deflected fluid, which, conveniently, may be air or water, serves to lay the thin plastic tube formed by the die orifice against the inner surfaces of the mold segments.

Mold conveyor assembly

The mold conveyor assembly is schematically illustrated in the right-hand portion of FIGURE 1 and is indicated, generally, as 60. In a preferred embodiment, the conveyor is an endless chain having links 71 (see FIGURES 3 and 4) trained about toothed idlers 61, 62 and sprocket 63. The conveyor may be conveniently driven through a variable speed motor 66 which transmits power through sprockets 64, 65 and drive chain 67. It should be understood that idlers 61, 62 are free to rotate on shafts mounted in the supporting frame with sprocket 63 drivingly connected to sprocket 64.

Preferably, the conveyor drive, which, in the embodiment illustrated, includes motor 66, chain 67 and sprockets 63, 64 and 65, may be moved along the supporting frame to accommodate endless conveyors of different lengths. For example, if the conveyor drive is moved toward the left in FIGURE 1, and suitable adjustments made to the location of idlers 61, 62, a shorter endless conveyor may be utilized, or, conversely, if the conveyor drive were moved to the right, a conveyor having a greater length may be incorporated into the system.

The frame includes legs 68, and upper and lower longitudinal members 69 and 70, respectively. Preferably, the supporting structure for the mold conveyor assembly 60 is an open framework, so that air may circulate freely in and around all sides of the conveyor assembly 60.

Figure 3:
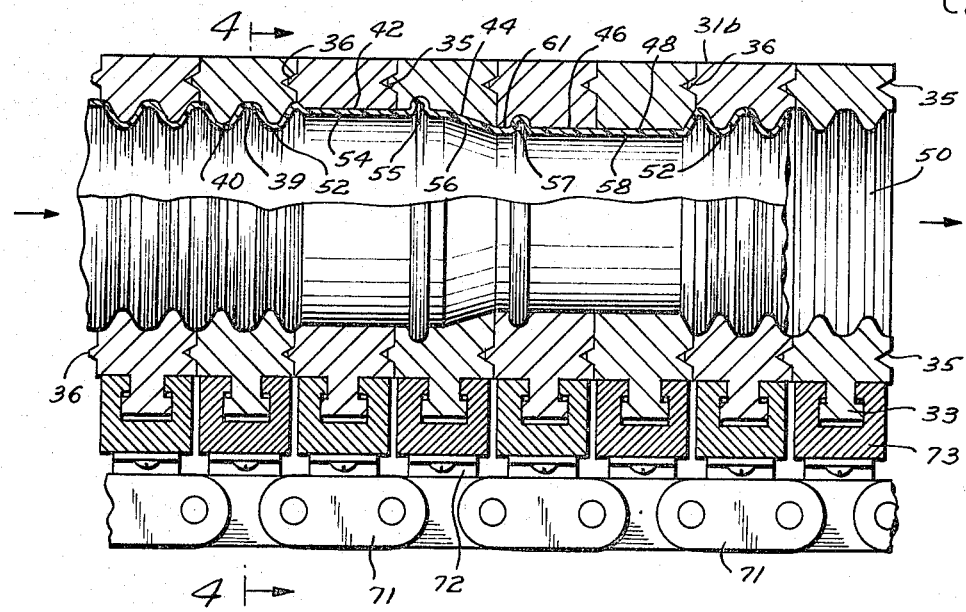
FIGURE 3 is an elevational view, taken along line 3—3 of FIGURE 2.
Figure 4:
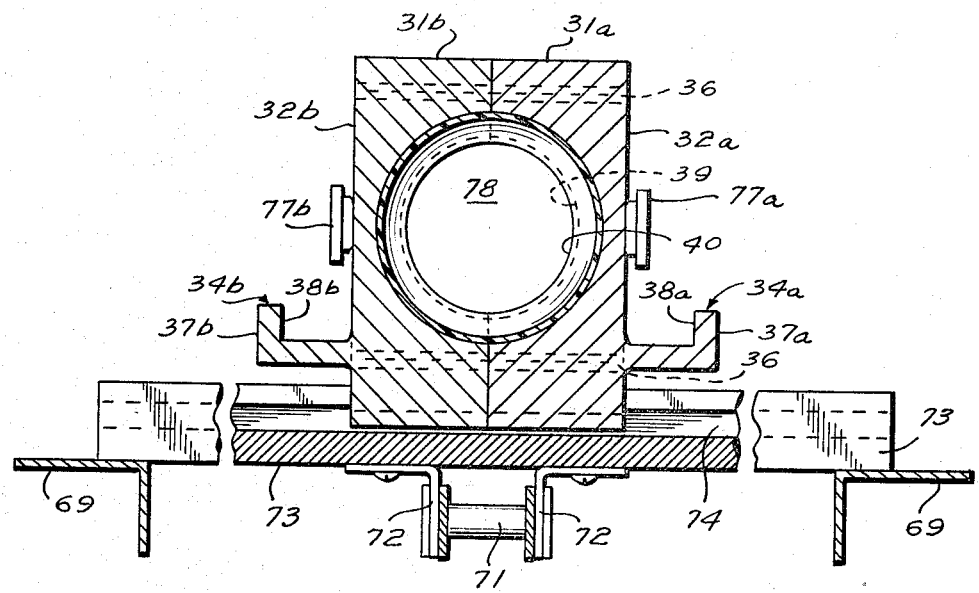
FIGURE 4 is an elevational view, partially in section, taken along line 4—4 of FIGURE 3 and illustrating one pair of mold segments in closed position.

As shown in FIGURES 3 and 4, each chain link 71 has a slide bar 73 secured to it by means of link brackets 72. For simplicity, as best shown in FIGURE 4, the outer ends of slide bar 73 rest upon the upper surface of horizontal frame members 69 which serve as tracks or rails for the slide bars. In operation of the conveyor, the outer ends of slide bars 73 slide along the upper surface of members 69, and, if necessary, lubrication or anti-friction bearings should be provided to insure that movement of the slide bars over these track surfaces is smooth and essentially free.

Slide bars 73 are provided with a keyway 74 extending lengthwise of the slide bars. Preferably, all the slide bars are of the same width, and the keyways provided in each of them of the same dimensions. Slide bars 73 serve as supports for the molds which are adapted for sliding movement in keyways 74, as will be described hereinafter, and, accordingly, the length of the slide bars is governed, primarily, by the travel of the mold segments from their fully open to their fully closed positions.

The article-forming molds

In the preferred embodiment of this invention, the molds are formed of two segments or halves, 31a and 31b. When the mold is in the closed position, that is, when the mold segments 31a and 31b are in abutting relation (see FIGURE 4), the mold illustrated is of a generally rectangular configuration having an aperture 78. This aperture is circular in those instances when round, tubular structures are desired, but it should be understood that the aperture will vary depending on the objects to be made. The base of each mold segment 31a and 31b is formed with a T-shaped key 33 of such dimension as to slidably fit within keyway 74 of slide bars 73.

Figure 2:
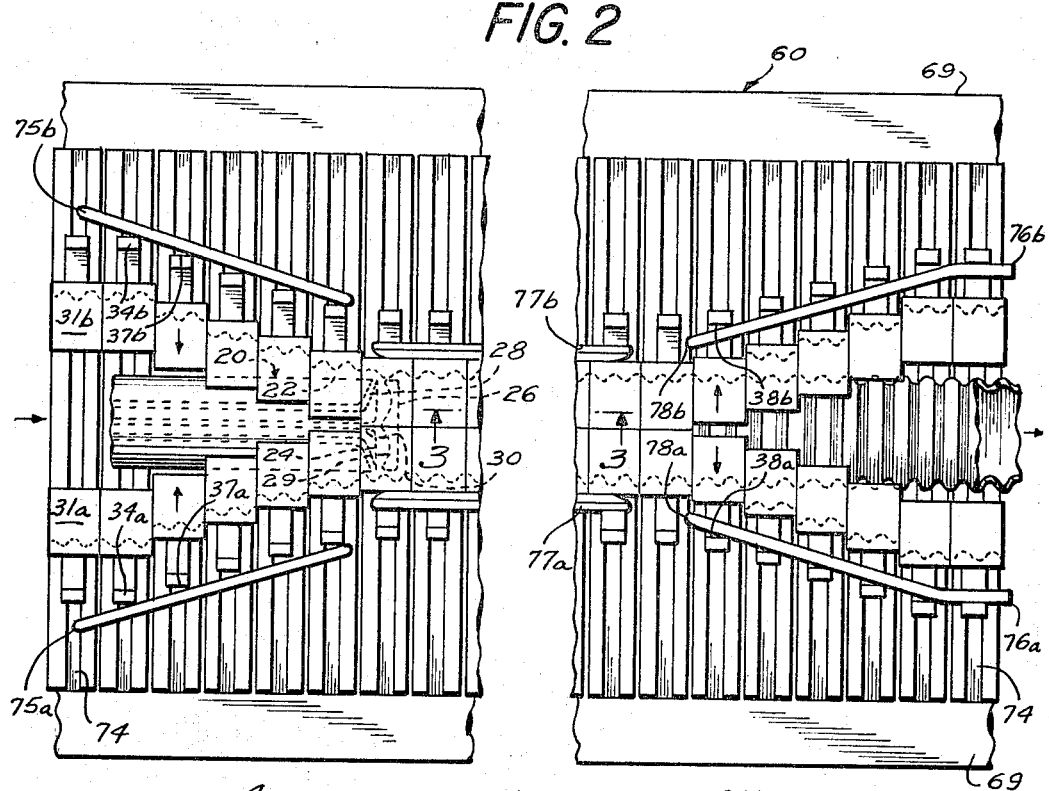
FIGURE 2 is a fragmentary plan view of the conveyor assembly and mold segments associated with said assembly illustrated in connection with the production of continuous lengths of corrugated tubing.

As may be appreciated by reference to FIGURES 2 and 3, the mold segments 31a and 31b may be positioned in the keyways 74 from the ends of the slide bars 73. It is contemplated that the slide bars 73 will remain substantially horizontal during operation of the conveyor assembly, and positive steps need not be taken to prevent mold segments 31a and 31b from falling out of the slide bars. This means that any mold segment may be easily removed from the conveyor, and, if necessary, replaced without difficulty even when the conveyor is in motion, merely by sliding the mold segment out of the slide bar in which it is mounted.

The ease with which mold segments may be inserted into, and removed from, slide bars 73 permits rapid replacement of mold segments. Thus, not only may damaged mold segments be replaced, but also mold segments having different internal object-forming configurations may be inserted into the slide bars to produce articles of widely varying configurations.

Each mold segment 31a and 31b is provided with a laterally extending L-shaped flange, indicated generally as 34a, 34b (see FIGURE 4), provided with a short vertical upright lug. Each mold segment is also provided with a horizontal, generally V-shaped groove 35 near the upper and lower sections of the mold segment. On the side of each mold segment opposite that in which grooves 35 are located, there are formed generally V-shaped projections 36. The notches 35 and projections 36, preferably, extend the entire width of the mold segments. Preferably, the notches 35 on one side of the mold segments and the projections 36 on the other side are directly opposite each other.

The two-part mold segments 31a and 31b, as shown in FIGURE 2, are arranged in opposed relation to each other so that a pair of cooperating mold segments is slidably fitted within a given slide bar 73. The mold segments may be considered as arranged in two banks or rows, with mold segments 31a in one bank and mold segments 31b in the other bank. Externally, all the mold segments are preferably, constructed the same, that is, have keys 33, notches 35 and projections 36. However, as may be appreciated, the arrangement of a pair of mold segments in opposed relation to each other on a given slide bar will result in orienting the notches 35 in one bank in the same direction, and the orientation of the notches 35 in the other bank in the opposite direction. Thus, as shown in FIGURE 3, all the notches 35 in the bank of mold segments (31b), there illustrated, are on the right, and the projections 36 are on the left. This results in the two projections 36 in one mold segment being mated with the two notches 35 in the next adjacent mold segment. In FIGURE 3, the projections are all oriented to the left, and, consequently, in the other bank of mold segments, not illustrated in FIGURE 3, the projections and mating notches would be oriented in the opposite direction, i.e., to the right.

The mold segments illustrated in the drawings are adapted to form lengths of corrugated tubing as will be evident from the mold configurations shown. Thus, each mold segment, 31a, 31b, is provided with an internal configuration having valleys 39 and crests 40. A mating pair of mold segments will define a circular configuration with the valleys and crests in each mold segment being in proper registry with each other to form the desired corrugated configuration.

According to another aspect of the invention, the configuration of the mold segments is selected such that there will be formed, in a continuous manner, lengths of corrugated tubing separated from each other by non-corrugated sections. To this end, there are provided mold segments having smooth annular molding surfaces 42. If, additionally, the non-corrugated sections are intended to serve as cuffs for given lengths of tubing, mold segments having cuff-forming molding surfaces may be inserted into the conveyor assembly by sliding such segments into the slide bars. Thus, as shown in FIGURE 3, mold segments may be included which have cuff-forming surfaces 44 and 46.

The mold segments are actuated, that is, closed and opened, by means of actuators which cooperate with cam surfaces on the upstanding lugs of flanges 34a and 34b on each mold segment (see FIGURE 2). Actuators 75a, 75b, 76a and 76b are suitably supported by the conveyor assembly frame structure so as not to interfere with the movement of the conveyor chain, but are so arranged as to be operatively associated with the mold segments to control their lateral movement with respect to each other as the segments move in the orbital path established by the chain conveyor.

In FIGURE 2, the travel of the conveyor and the associated slide bars and mold segments is from left to right, and it can be seen that no part of the cooperating mold segments 31a and 31b in the extreme left of FIGURE 2 contacts either actuators 75a or 75b. As this pair of mold segments moves toward the extrusion die 20, the cam surface 37a contacts actuator 75a and cam surface 37b contacts actuator 75b. As actuators 75a and 75b are directed inwardly toward each other, it will be understood that the mold segments of a pair in contact with the actuators 75a and 75b will be urged toward each other as the conveyor chain carries the mold segments into the convergence of the actuators. Thus, the inner surfaces of 75a and 75b, respectively, act on cam surfaces 37a and 37b of an opposing pair of mold segments, urging the molds inwardly.

When the mold segments reach the ends of actuators 75a and 75b, they are fully closed and thus a closed mold is available to receive the tubular material leaving the extrusion die (see FIGURE 2). Locking bars 77a and 77b are also provided which act against the sides 32a and 32b of the mold to retain them in a closed position as they travel away from the extrusion nozzle. The length of the locking bars is determined by the amount of time required for the thermoplastic composition being molded to sufficiently set and become self-supporting. After the closed molds have travelled a sufficient distance to permit setting of the plastic composition, actuators 76a and 76b serve to open the molds, as clearly shown in FIGURE 2. Actuators 76a and 76b are arranged so as to diverge from each other in the direction of conveyor travel. In progressively opening the molds, the outer surfaces of actuators 76a and 76b act on the inner cam surfaces 38a and 38b of flanges 34a and 34b, respectively. Thus, after a short distance, these actuators serve to fully separate the mold segments from each other and release the completely formed, corrugated, tubular article 50.

Operation of the apparatus

The operation of the apparatus will now be described. For simplicity, the operation will be traced by reference to a conveyor assembly having molds for producing continuous lenghs of corrugated tubing with the corrugated lengths separated by cuffs. The lengths of tubing 50 taken from the apparatus, when severed at the cuffs, are intended for use as flexible hose.

The macromolecular polymeric material, e.g., a thermoplastic resin, which has been selected is placed into hopper 16 and the extruder assembly 2 started. Screw conveyor 14 drives the feedstock forward into the heating zone 18 which is at the desired temperature. The residence time in the heating zone 18 should be sufficient to render the feedstock composition mobile and capable of being blow molded at low fluid pressures and low extrusion pressures. The heated composition is then driven forward into the extrusion die 20 and flows along bore 21 and out through the die orifice formed between surface 28 of die body 22 and surface 25 of die cap 24. With the flow of heated feedstock material along bore 21, the blow fluid, preferably air, is passed through orifice 30 and deflected outwardly by deflector surfaces 29 of deflector 26.

The end of the extrusion die 20 is spatially located with respect to the conveyor assembly such that the die orifice is approximately in the middle of the first fully closed mold, as best shown in FIGURE 2. With the die in this position, the hot plastic tube leaving the orifice is laid against the inner mold surfaces 39 and 40 by the air blowing through the die. As will be recognized by those persons skilled in the art, continuous blow molding requires that the end of the tube leaving the die at start-up be sealed in order that the pressure of the fluid stream be effective to place the hot plastic against the inner surfaces of the mold. The sealing of the tube as it first emerges may be accomplished either before the conveyor assembly is placed in motion or while the conveyor is in motion. The technique of effecting the seal is well-known to those skilled in the art. For simplicity, the seal is illustrated in the drawing as a plain cork stopper 51 stuffed into the end of the tube. Once the seal has been effected, the conveyor may be brought up to production speed.

As the fully open mold segments 31a and 31b approach the die orifice from the lower run of the chain conveyor, they will enter the diverging zone defined by actuators 75a and 75b at which time the mold segments will have reached the upper, substantially horizontal, run of the conveyor. Futher movement of the conveyor will bring cam surfaces 37a and 37b of flanges 34a and 34b against the inner surfaces of actuators 75a and 75b causing the mold segments to progressively approach each other. When the pair of mold segments reaches the die orifice, the mold is fully closed (see FIGURE 2), and the air stream gently lays the hot tube leaving the orifice against the valleys and crests 39, 40 of the mold. At this point, the molds are locked together as they continue to move downstream of the die orifice until such time as the hot tube has cooled sufficiently and the valleys and crests of the tube wall 52 become self-supporting.

The distance required to be travelled by the closed molds is relatively short, because the heat of the hot extruded tube may be quickly dissipated by the conveyor assembly of the invention. First, the mold segments, themselves, may be fabricated of materials, as cast aluminum, which possess good heat transmission characteristics. Secondly, as there is only one conveyor, instead of two as heretofore utilized, the sides and tops of the molds are exposed and are available as heat dissipating surfaces. Thus, the invention provides for about 50% more heat dissipating surfaces than is found in those know prior art blow molding devices having two conveyors, one above the other, and thereby, at best, permit only the mold sides to effectively serve as heat dissipating surfaces. Thirdly, the large amount of exposed mold surfaces available to dissipate heat, coupled with the open framework supporting the conveyor, permit effective use to be made of auxiliary cooling stream. To this end, there may be provided a hood 80 extending over the horizontal run of the conveyor, beginning a short distance downstream of the die orifice, into which cold air may be blown through inlet 82 and directed against the closed hot molds. Additional cooling air may be directed upwardly from the bottom of the conveyor by means of blowers.

Accordingly, an important objective of the invention is achieved in that high-speed production of shaped articles is made possible with a relatively short conveyor assembly under conditions of extrusion and fluid pressure which are conductive to faithful reproduction of the mold surfaces by the plastic feedstock composition.

As the closed molds leave the zone of the locking bars 77a and 77b, they enter the unlocking zone defined by the diverging actuators, 76a and 76b. The tips 78a and 78b of these actuators enter the space between flanges 34a and 34b and the mold walls 32a, 32b, and the outer surfaces of the actuator act against the cam surface 38a and 38b to progressively open the molds, freeing a self-supporting corrugated tube 50.

Throughout the travel of the mold segments along the horizontal run of the conveyor, and the attendant movement of opposed mold segments toward and away from each other under the influence of the actuators, another important advantage of the invention becomes readily apparent. This advantage directly flows from the structure of the mold segments and their free-sliding support in slide bars 73.

A serious problem in continuous molding systems utilizing constantly moving mold segments lies in insuring proper registry of the mold segments to obtain faithful reproduction of the mold configurations. Heretofore, such systems incorporated numerous precision moving parts to achieve the requisite registration of the molds. While such systems frequently attained the desired registration, it was accomplished by means of costly equipment maintained at great expense. Contrasted with this, the article-forming molds in the apparatus of this invention are of simple, rugged construction, and are so constructed as to be self-registering, thereby precluding misalignment of opposed mold segments.

When the actuators act on the mold segments, the mold segments slide toward each other along keyways 74 provided in slide bars 73. The aligned movement of the mold segments toward and away from each other is, therefore, obtained, and to a great extent, controlled by a pair of mold segments in opposed relation to each other in the same keyway. However, as the mold segments are somewhat loosely mounted in the keyways in order to insure their free movement, the risk of misalignment, especially under high-speed operation of the conveyor assembly, is not totally eliminated. Proper registration of the mold segments is completely assured by reason of the notches 35 and projections 36 formed in the mold segments.

As hereinabove described, each mold segment 31a and 31b is provided with a pair of notches 35 on one side and a pair of projections 36 on the other. With the mold segments arranged in two opposed banks, the segments in one bank will have the notches and projections arranged in a direction opposite to the notches and projections in the other bank. Thus, by referring to FIGURES 2 and 3, it can be appreciated that the notches 35 and projections 36 in the bank of mold segments 31b will be oriented to the left, while the notches and projections in the bank of mold segments 31a will be oriented to the right.

The cooperation between the two projections in one mold segment with the notches in the next adjacent mold segment not only serves to stabilize the movement of the mold segments with respect to each other, but also effectively precludes misalignment. Because the projections 36 in the mold segments of one bank are oriented opposite to the direction of the projections in the other bank, it is impossible for one mold segment to travel toward a mold segment other than that with which it is paired in the same keyway. Consequently, the use of the slide bar for constantly supporting a pair of mold segments in opposed relation to the other, and the cooperation of the notches and projections between adjacent mold segments in the same bank insures that the mold segments will travel in a rectilinear direction always toward and away from each other so that when the molds are closed, the mold configurations are in proper registry to produce a sharply defined object.

When the mold segments are opened and the self-supporting corrugated tube 50 freed from them, it may be taken from the apparatus, wound on a reel and stored, or, if preferred, sent directly to a cutting station. The cutting station may be part of the entire apparatus or be separate and distinct therefrom.

By providing molds with cuff-forming surfaces as 42, 44, 46, and 48 (see FIGURE 3), cuff-sections 54, 56 and 58 having suitable beads 55, 57 will be formed at predetermined intervals. Additionally, one section of the cuff, such as 56, may have a tapered opening. The continuous lengths of tubing emerging from the conveyor assembly may be severed at a point corresponding to 61 to produce individual hose sections having one end tapered, as at 56, and the other end plain, as at 58. The production of the tubing in one continuous length will continue so long as the machine is operated and a supply of thermoplastic material fed through the extruder assembly. By substituting mold segments with different internal mould configurations, different types of tubing may be produced, e.g., tubing having a rectangular cross-section, or articles other than tubing may be made in a continuous manner.

The improved results flowing from the apparatus of this invention may be more fully appreciated by considering the high degree of flexibility possessed by it as illustrated from the following example.

If the endless conveyor were 18 ft., overall, and the mold segments slidably mounted on it adapted to form corrugated tubing having cuffs at either end, one continuous revolution of the conveyor would produce a single 18 ft. length of tubing with a cuff portion at each end. If 6 ft. lengths of corrugated tubing having cuffs were desired, they may be produced by placing three cuff-forming mold segments having cuff-forming surfaces, such as 42, 44, 46, 48 (see FIGURE 3), at 6 ft. intervals along the endless conveyor. In a similar manner, if 9 ft. lengths having cuff sections were desired, only two cuff-forming mold segments need be inserted at 9 ft. intervals along the conveyor chain. Should 10 ft. lengths of corrugated tubing having cuff sections be desired, the conveyor drive may be merely shifted, toward the right in FIGURE 1, and a 20 ft. mold conveyor assembly used along which cuff-forming mold segments are placed at 10 ft. intervals, or, alternatively, the drive assembly may be shifted to the left and a 10 ft. conveyor utilized. It may also be appreciated that if hollow tubing having a cross-section other than circular were desired, the apparatus of this invention need only be provided with mold segments having the desired internal object-forming configurations. The existing mold segments may be easily slid out of the supporting slide bars and replaced with the desired mold segments.

Although the invention has been described with particular reference to specific illustrative embodiments, the same are not to be construed as in any way limiting the invention. Reference is, therefore, to be had solely to the appended claims for the purpose of determining the scope of the invention.

I claim:
1. In an apparatus for the continuous blow molding of tubular thermoplastic articles, including:
   (a) extrusion means to form a continuous plastic tube in a softened condition adapted for forming by internal fluid pressure;
   (b) means to introduce a pressurized fluid internally of said tube;
   (c) a single continuous conveyor movable through a closed path and located adjacent the extrusion means, the conveyor being movable in a substantially vertical plane;

(d) a plurality of slide bars mounted transversely on the conveyor;

(e) a pair of segments mounted in opposed relationship for movement on each slide bar toward and away from each other and in a direction substantially perpendicular to the direction of movement of the conveyor, each mold segment having a mold cavity facing inwardly toward the mold cavity in the opposing mold segment, the mold segment being movable inwardly into abutting relationship with each to form a transversely enclosed mold larger than the transverse cross sectional size of the plastic tube; adjacent mold segments on adjacent slide bars being in abutting relationship with each other during the molding operation to form a continuous mold;

(f) means to move the opposed mold segments toward and away from each other; and, (g) each pair of opposed mold segment being movable with the conveyor at a speed synchronized with the rate of feed of the plastic tube and receiving said tube within the mold; the pressurized fluid being introduced internally of the tube after the tube is within the mold to expand the tube into conformity with the shape of the mold cavity to form a continuous tubular thermoplastic article.

2. In an apparatus according to claim 1 wherein:
(a) each of said slide bars has an undercut key slot extending longitudinally of the bar and perpendicular to the direction of movement of the conveyor; and,
(b) each of said mold segments having a key integral with the underside of the segment and slidably mounted in said key slot to permit reciprocation of the mold segment along the slide bar in a controlled path; said key having a projection slidably engaged in the undercut of the key slot.

3. In an apparatus according to claim 2 wherein:
(a) said key slot is an inverted T in vertical cross section; and,
(b) said key has a configuration corresponding to said slot.

4. In an apparatus according to claim 2 wherein:
(a) the key slot in each bar extends the entire length of the bar and opens at each end thereof; and
(b) each of said mold segments being removable from the bar by sliding the key to and out of the open end of the slot.

5. In an apparatus according to claim 1 wherein:
(a) the plastic tube is extruded through a die having an outer die plate enclosing and spaced from an inner core;
(b) a passageway through said core with an exit opening inside the plastic tube;
(c) said passageway, at a point remote from the exit, being joined to said means to introduce pressurized fluid internally of the tube; and,
(d) a deflector plate positioned in spaced relationship to said exit and constructed to deflect pressurized fluid issuing from the exit in a uniform radial direction to expand the tube against the mold cavity.

6. In an apparatus according to claim 1 wherein:
(a) the mold segment on each slide bar is in sliding abutting face-to-face relationship to the mold segments on immediately adjacent slide bars;
(b) a continuous groove in the face of one abutting mold segment;
(c) a project rib on the face of the mold segment abutting said one mold segment, said rib being slidable in said groove; and,
(d) said groove and rib extending transversely to the direction of movement of the conveyor.

7. In a apparatus according to claim 1 including:
(a) means engageable with the mold segments to move the opposed segments toward and away from each other while the conveyor is moving through a closed path; and,
(b) second means to lock the opposed mold segments in abutting relationship to each other after the plastic tube has been deposited within the mold segments.

References Cited by the Examiner

UNITED STATES PATENTS

| 2,641,022 | 6/1953 | Kress | 264—95 |
| 2,866,230 | 12/1958 | Holte | 18—19 |
| 2,974,361 | 3/1961 | Gerlke et al. | 18—4 |
| 3,013,309 | 12/1961 | Mauer et al. | 264—95 |

FOREIGN PATENTS

| 1,346,455 | 11/1963 | France. |
| 888,615 | 1/1962 | Great Britain. |

WILLIAM J. STEPHENSON, *Primary Examiner.*